United States Patent
Tasker et al.

(10) Patent No.: US 9,426,307 B2
(45) Date of Patent: Aug. 23, 2016

(54) NON-LINEAR DATA CHARGING (71) Applicant: Oracle International Corporation, Redwood Shores, CA (US)

(72) Inventors: Richard Beaumont Tasker, Los Altos, CA (US); Gireesh Malaksamudra, Sunnyvale, CA (US); Meera Sundaram, San Jose, CA (US); Raghavassimhan Komboorsundararajan, Cupertino, CA (US); Usha Rajgopal, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 124 days.

(21) Appl. No.: 14/506,059

(22) Filed: Oct. 3, 2014

(65) Prior Publication Data

US 2016/0100063 A1    Apr. 7, 2016

(51) Int. Cl.
*H04M 11/00* (2006.01)
*H04M 15/00* (2006.01)
(Continued)

(52) U.S. Cl.
CPC .......... *H04M 15/64* (2013.01); *H04L 12/1407* (2013.01); *H04L 12/1467* (2013.01); *H04L 12/1485* (2013.01); *H04M 15/61* (2013.01); *H04W 4/24* (2013.01); *H04W 76/064* (2013.01)

(58) Field of Classification Search
CPC ..... H04W 4/24; H04W 76/064; H04M 15/64; H04M 15/1561
USPC .......................................... 455/407; 370/338
See application file for complete search history.

(56) References Cited

U.S. PATENT DOCUMENTS 7,167,699 B1    1/2007    Kretsinger
7,717,334 B1    5/2010    Rolf
(Continued)

FOREIGN PATENT DOCUMENTS

EP          1732302 A1 * 12/2006    .......... H04L 12/1414
EP          2178245 A1      4/2010
WO      2010/027356 A1      3/2010

OTHER PUBLICATIONS

"3rd Generation Partnership Project; Technical Specification Group Services and System Aspects; Telecommunication Management; Charging Management; Diameter Charging Applications"; Release 12; 3GPP Standard; 3GPP TS 32.299; 3rd Generation Partnership Project (#GPP); Mobile Competence Centre; 650, Route des Lucioles; F-06921 Sophia-Antipolis Cedex, France; vol. SA WG5, No. V12.6.0; 2014-0926; pp. 1-164; XP050926076.

(Continued)

*Primary Examiner* — Marcos Batista
(74) *Attorney, Agent, or Firm* — Miles & Stockbridge P.C.

(57) ABSTRACT

An Online Charging System ("OCS") for charging a data session of a subscriber, in response to a request to initiate the data session provides a first granted service units of data for the data session. During the data session, the OCS receives a change in charging conditions for the subscriber and, in response to the change, sends a re-authorization message to the subscriber. In response to the re-authorization message, the OCS receives from the subscriber a first update message that includes a used service units for the data session since the previous update message. In response to the update message, and based on the change in charging conditions and the used service units, the OCS then provides a second granted service units of data for the data session.

20 Claims, 4 Drawing Sheets

(51) Int. Cl.
*H04W 4/24* (2009.01)
*H04W 76/06* (2009.01)
*H04L 12/14* (2006.01)

(56) References Cited

U.S. PATENT DOCUMENTS

| 8,634,407 | B2 | 1/2014 | Mohammed et al. |
| 2009/0076984 | A1* | 3/2009 | Guionnet ........... G06Q 30/0283 705/400 |
| 2011/0003579 | A1 | 1/2011 | Cai et al. |
| 2011/0066530 | A1 | 3/2011 | Cai et al. |
| 2011/0270722 | A1 | 11/2011 | Cai et al. |
| 2014/0082170 | A1 | 3/2014 | Kaemmerer et al. |

OTHER PUBLICATIONS

H. Ericsson et al.; "Diameter Credit-Control application; rfc4006.txt"; 5.JCT-VC Meeting; 96.MPEG Meeting; Mar. 16, 2011-Mar. 23, 2011; Geneva; http://wftp3.1tu.int/av-arch/jvtvc-site; Aug. 1, 2005; XP015041993.

Oracle Data Sheet; Oracle Communications; "Oracle Communications Network Charging and Control"; 2012.

Oracle Communications; "Oracle Communications Billing and Revenue Management Product Overview"; on Oracle White Paper; May 2012.

Oracle Data Sheet; Oracle Communications; "Oracle Communications Elastic Charging Engine"; 2012.

S. Gioia et al.; "Understanding the IMS Charging Architecture"; Jul. 25, 2007; http://www.oracle.com/technetwork/articles/grid/imc-charging-architecture-085533.html.

Digital cellular telecommunications system (Phase 2+); Universal Mobile Telecommunications System (UMTS); LTE; Telecommunication management; Charging management; Online Charging System (OCS): Applications and Interfaces; 3GPP TS 32.296 version 11.5.0 Release 11 ; ETSI TS 132 296 V11.5.0; Apr. 2013; pp. 1-29.

Oracle Data Sheet; Oracle Communications; "Oracle Communications Billing and Revenue Management"; 2012.

* cited by examiner

NON-LINEAR DATA CHARGING

FIELD

One embodiment is directed generally to telecommunications, and in particular to online charging for telecommunications data services.

BACKGROUND INFORMATION

Service providers/operators typically provide numerous voice and/or data services to subscribers using wireline and/or wireless communications networks. Examples of such services include cellular telephony, access to the Internet, gaming, broadcasting or multicasting of audio, video, and multimedia programming, etc. User equipment such as cell phones, personal data assistants, smart phones, text messaging devices, global positioning system ("GPS") devices, network interface cards, notebook computers, and desktop computers, may access the services provided by the communications networks over an air interface with one or more base stations.

Operators use offline and online charging functions to keep track of the charges incurred by each device for using the various services. The $3^{rd}$ Generation Partnership Project ("3GPP"/"3GPP2") standards groups have defined a set of specifications that may be used to implement online charging systems and offline charging systems to cover charging in the various network domains (e.g., a circuit switching network domain, a packet switching network domain, and/or a wireless domain), IP multimedia subsystems ("IMS"), and emerging 3G/OMA application services.

However, operators are experiencing increasing volume of data usage from the growth in smart phones and other mobile devices. This growth is putting a strain on the operators' network resources and results in either a reduced subscriber experience, due to an overloaded network resulting in congestion and poor data bandwidth, or in expensive roll-out of additional network capacity for the operator.

SUMMARY

One embodiment is an Online Charging System ("OCS") for charging a data session of a subscriber. The OCS, in response to a request to initiate the data session, provides a first granted service units of data for the data session. During the data session, the OCS receives a change in charging conditions for the subscriber and, in response to the change, sends a re-authorization message to the subscriber. In response to the re-authorization message, the OCS receives from the subscriber a first update message that includes a used service units for the data session since the previous update message. In response to the update message, and based on the change in charging conditions and the used service units, the OCS then provides a second granted service units of data for the data session.

DETAILED DESCRIPTION

One embodiment is an online charging system that during a data session receives updates of data usage, and determines charging conditions at each of the updates. Therefore, rather than assuming linear data usage throughout the entire data session, specific charging conditions such as revised available balances, changing data rates, etc., can be considered at different time periods during the session, using a more accurate measurement of data usage for each session.

Figure 1:
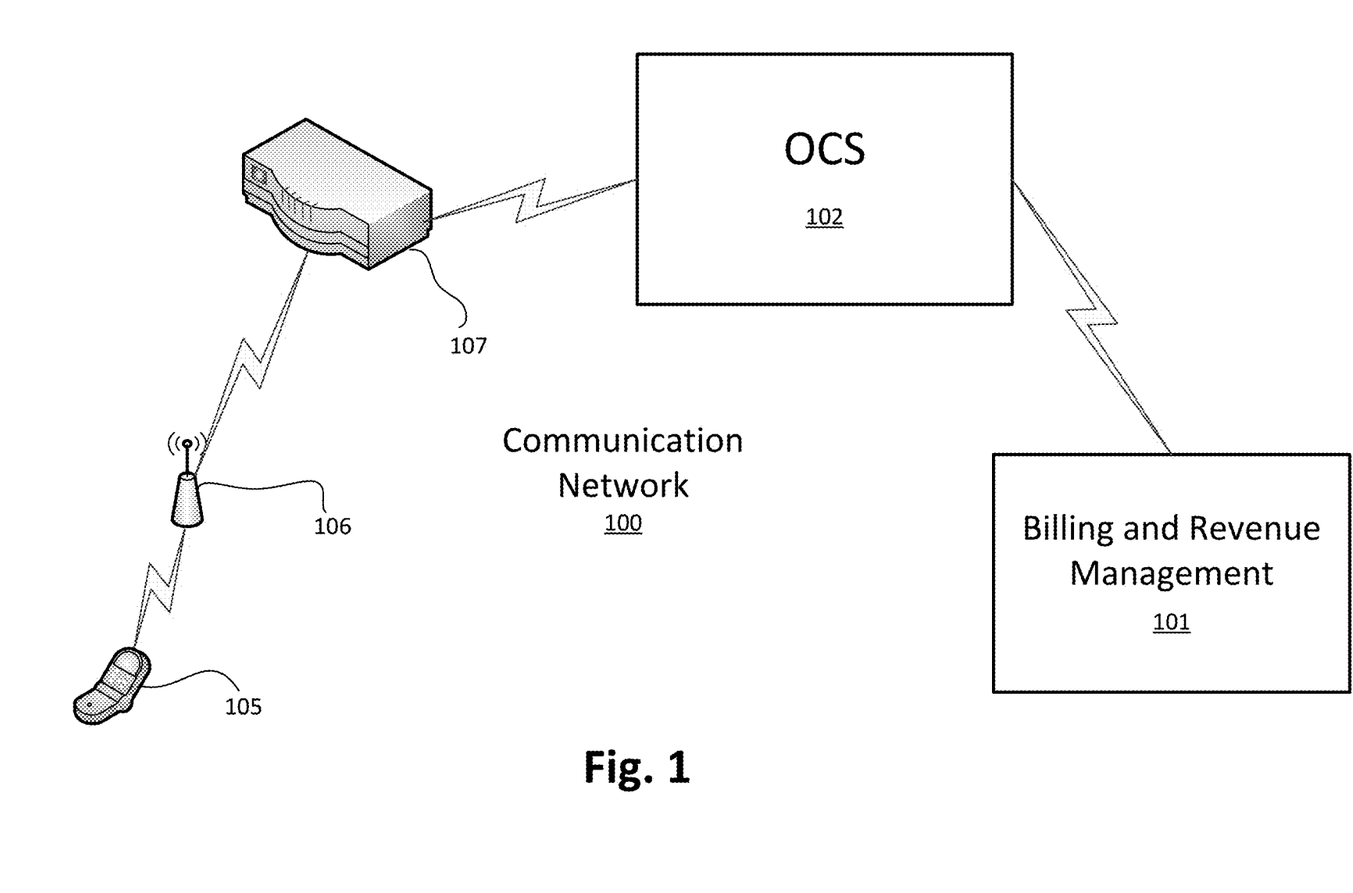
FIG. 1 is an overview diagram of a communications network including network elements that implement embodiments of the present invention and/or interact with embodiments of the present invention.

FIG. 1 is an overview diagram of a communications network 100 including network elements that implement embodiments of the present invention and/or interact with embodiments of the present invention. Network 100 includes an Online Charging System ("OCS") 102 that in general is a runtime engine that provides online charging for a communications session. OCS 102 is coupled to Billing and Revenue Management System ("BRM") 101. BRM stores information for each registered user/customer of network 100, and for each customer determines charging parameters such as usage rates, bundles of available minutes and promotions, current balances, etc.

A user will interface with network 100 through user equipment ("UE") 105. UE 105 can be any type of device that allows a user to participate in a communications session that includes data transmission that may represent a voice call, a video presentation, a Short Message Service ("SMS"), etc. Network 100 can include many different types of network elements that connect UE 105 to network 100, including a cellular tower 106, a router 107, and other known devices not shown in FIG. 1.

Online charging through OCS 102 refers to a charging mechanism where charging information can affect, in real-time, the service rendered. In online charging, charging information for network resource usage is collected concurrently with the resource usage. However, authorization for the network usage must be obtained by the network based on the charging results returned by OCS 102. The charging decisions in OCS 102 are made based on the allowable resources for a user that are obtained from BRM 101 and maintained in OCS 102.

In one embodiment, network 100 is an IMS network in accordance with the 3GPP standards. As opposed to post-paid charging, where the services are provided first and the IMS user is billed later, OCS 102 provides pre-paid charging, where the IMS user has to have an account balance prior to services being provided, and the account balance is debited as the services are provided.

In one embodiment, OCS 102 includes an online charging function, an account balance management function ("ABMF"), and a rating function ("RF"). The ABMF maintains an amount of service units in an account of an IMS user. The rating function determines the cost of service usage according to a tariff defined by the network operator. The online charging function utilizes the ABMF and the rating function in order to perform online charging.

Additional network/service elements in the IMS network in one embodiment, not shown in FIG. 1, such as a Proxy-Call Session Control Function ("P-CSCF"), a Session-Call Session Control Function ("S-CSCF"), and an application server ("AS"), include Charging Trigger Functions ("CTF"). These CTFs are adapted to monitor service usage and to generate charging messages responsive to charging events. The CTFs then transmit the charging messages to OCS 102 to provide online charging for the service usage.

Online charging may be performed as direct debiting or unit reservation. For direct debiting, the online charging function debits the units immediately from the account of the user for an individual transaction. For unit reservation, the online charging function grants a quota of units from the account of the user, and provides the quota of units to the requesting service element. The requesting service element then performs budget control by monitoring service usage and deducting from the quota accordingly. If the quota of units expires, then the service element requests another quota of units, and the process continues. After the service has terminated, the total amount of units to deduct from the user's account is resolved.

For example, the following illustrates an example of charging for a typical session in an IMS network. An IMS user either initiates or is invited to receive a session through the appropriate signaling message, such as a Session Initiation Protocol ("SIP") INVITE message. An S-CSCF is assigned to the IMS user to manage the session, so the signaling message goes through the S-CSCF. Responsive to receiving the signaling message for the IMS user, the S-CSCF contacts a Home Subscriber Server ("HSS") to access the subscriber profile for the IMS user. The subscriber profile, among other things, indicates the level of service subscribed to by the IMS user, any supplementary services subscribed to by the user, etc. The subscriber profile also indicates that the IMS user is a prepaid user. Thus, responsive to the detecting the start of the session, a CTF in the S-CSCF initiates online charging for the session. To initiate online charging, the CTF generates a Diameter Ro Credit Control Request ("CCR") INITIAL message indicating the start of the session, and transmits the CCR INITIAL message to OCS 102.

The online charging function in OCS 102 then processes information in the CCR INITIAL message to identify the IMS user, to determine the media type for the session, etc, and accesses the rating function with this and other information to determine a rating for the session. The online charging function also accesses the ABMF to determine whether the IMS user has a sufficient account balance to initiate the session, and if so, to determine how many service units to grant for the session. The online charging function then generates a Credit Control Answer ("CCA"):INITIAL message, and transmits the CCA:INITIAL message to the S-CSCF. The CCA:INITIAL message indicates that the session is allowed, and also indicates the number of quota granted for the session.

The S-CSCF (or the IMS gateway) receives the CCA:INITIAL message, and performs budget control. For budget control, the S-CSCF identifies the quota of service units, and decrements the quota as the session continues. If the CTF in the S-CSCF identifies another charging event, then the S-CSCF generates a CCR:UPDATE message. For example, a charging event may include receiving a SIP 200 OK message acknowledging a SIP INVITE, a RE-INVITE, or an UPDATE message, may include the expiration of the quota of service units, may include the expiration of a validity timer, etc. The S-CSCF transmits the CCR:UPDATE message to OCS 102. The online charging function performs similar processes to grant another quota of service units (if available) for the session, generates a CCA:UPDATE message, and transmits the CCA:UPDATE message to the S-CSCF. The CCA:UPDATE message indicates that the session is allowed to continue, and also indicates the additional quota of service units granted for the session.

The S-CSCF (or the IMS gateway) receives the CCA:UPDATE message, and again performs budget control on the newly granted quota. Assume at some later time that the session ends. Responsive to identifying the end of the session, the CTF in the S-CSCF generates a CCR:TERMINATION message, and transmits the CCR TERMINATION message to the OCS. The CCR:TERMINATION message indicates the number of service units used for the session (either for duration of the session or for the latest slice of the quota granted by the online charging function). The online charging function then resolves the total debit for the session from the account of the IMS user in the ABMF.

BRM 101, such as the BRM product from Oracle Corp., allows the network operator to set up services, using optional components such as the Global System for Mobile Communications ("GSM") Manager and Remote Authentication Dial-In User Service ("RADIUS") Manager to capture data about service usage (e.g., the number of hours in a customer's data session or length of a telephone call). Using BRM 101, the network operator can also define a price list to define how much to charge for the services. For example, a network operator can charge for wireless phone service or Internet access usage, monthly subscription fees, and setup fees.

BRM 101 further is used for registering customers, such as having the customers call a customer service representative or by using a Web page. A customer typically signs up for one or more services, such as Internet access and email. Customer account data, such as telephone numbers, Internet service logins, and billing information, is stored in a BRM database.

BRM 101 further is used to managing customers. When customer account information changes (for example, if a customer changes its credit card), customer management tools are used to update account information or Web pages can be provided for customers to manage their own account.

BRM 101 further is used for authenticating and authorizing customer logins. For example, for services where usage can be tracked in real time, BRM 101 uses customer data stored in the BRM database to authenticate the customer's identity and to verify the customer's authorization to use that service.

BRM 101 further is used for rating service usage, by measuring service usage and rating it (e.g., 10 cents per minute for a wireless call). The charge is added to the customer's account balance.

In one embodiment, an interface between BRM 101 and OCS 102 and other network elements of network 100 is controlled by an "Communications Online Mediation Controller" from Oracle Corp. It provides high-speed translation of the network messages from Diameter Ro or RADIUS protocols to the internal BRM communication protocol, which then performs the processes of authorization, authentication, event rating, and account balance updates. The Communications Online Mediation Controller has a native integration to BRM 101 in one embodiment, so that it establishes connections with BRM 101 and makes use of these connections to invoke BRM internal processes.

Figure 2:
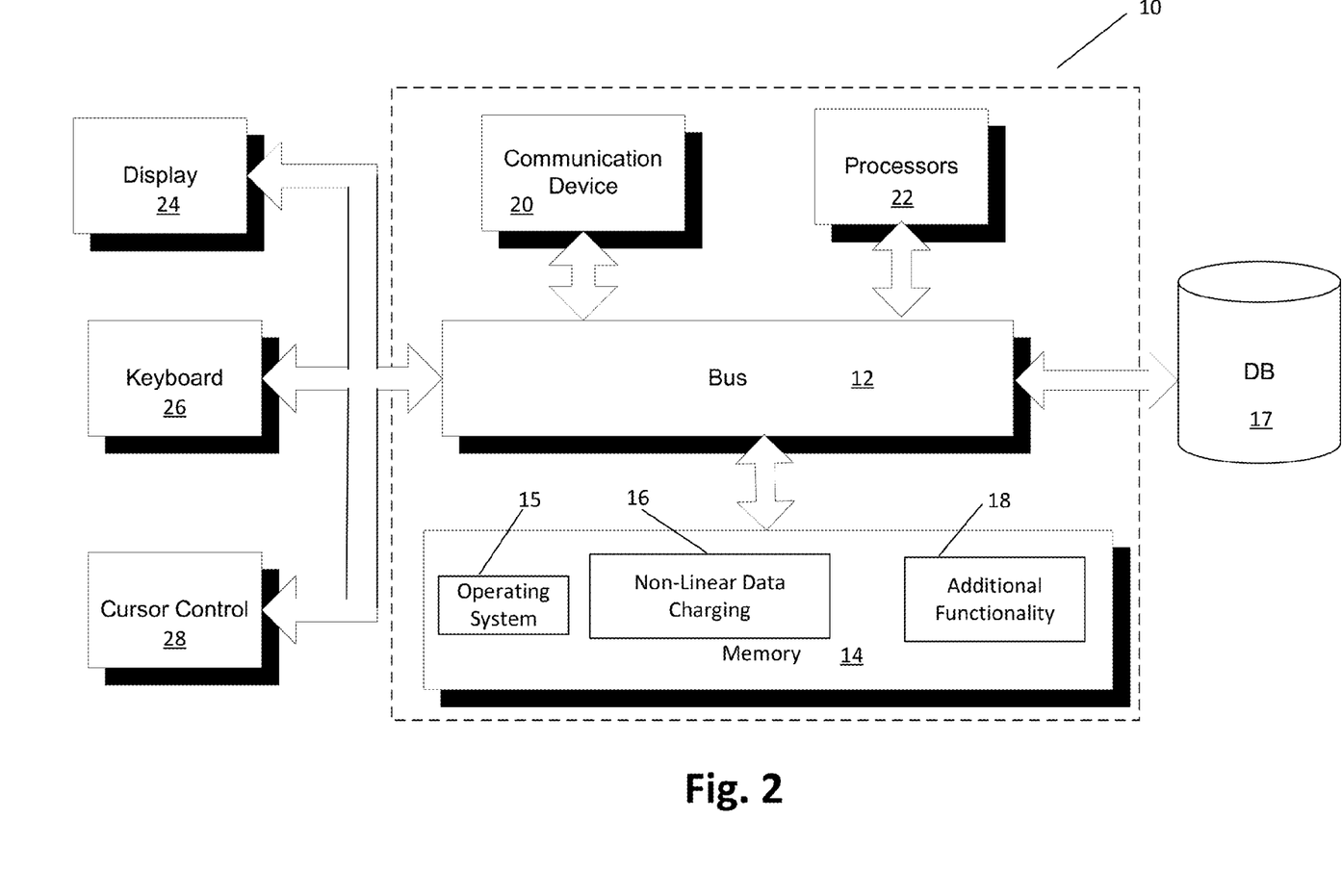
FIG. 2 is a block diagram of a computer server/system in accordance with an embodiment of the present invention.

FIG. 2 is a block diagram of a computer server/system 10 in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of OCS 102, system 10 may be a server that in general has no need for a display 24 or one or more other components shown in FIG. 2.

System 10 includes a bus 12 or other communications mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communications device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a non-linear data charging module 16 for charging a data session on a non-linear basis, and all other functionality disclosed herein. System 10 can be part of a larger system, such as added functionality to the "Oracle Communications Elastic Charging Engine" from Oracle Corp. Therefore, system 10 can include one or more additional functional modules 18 to include the additional functionality. A database 17 is coupled to bus 12 to provide centralized storage for modules 16 and 18.

In a typical communications network and typical IMS session as described above, voice services are consumed linearly (e.g., a ten minute voice call is always "on" and consuming minutes during the entire call). In contrast, data usage during a data-based communications session is consumed non-linearly. For example, during a one hour data session, during some periods there may be heavy downloading of data when a video is streaming, while during other periods there may be virtually no downloading of data while a user is reading already downloaded data. However, known charging systems are not able to consider the specific charging conditions, such as available balances, offers, a recharging/top-up of a balance, etc., at various points during an ongoing data session. Instead, known charging systems treat the entire data session as a single session in which it is assumed that the total data consumed was consumed linearly throughout the session.

As a result, operators do not have the ability to accurately provide different data rates for peak and off-peak time periods. Known charging systems often take either the charging conditions at the start of the session or at the end and use those conditions as the basis for charging for the whole session. Therefore, the quantity to be charged is linearly distributed rather than based on the actual consumption pattern. However, with the increase in long-running data sessions (e.g., an hour or greater as when a subscriber is viewing a movie), this is not acceptable to subscribers and may result in excessive charges. Further, operators currently do not have a way to influence the subscriber behavior so that subscribers use less data during peak times and more data during off-peak times.

Finally, operators also have a challenge with long-running data sessions because they currently can only recognize the revenue once the session has ended. However, with data sessions spanning days and even weeks, operators can experience a loss of revenue for the accounting time period when the data session began if it ends in a later accounting time period. Some operators will periodically cut long running sessions in order to be able to recognize the revenue for the usage already consumed by their subscribers, which can potentially result in a reduced customer experience.

Embodiments of the present invention receive one or more "updates" during the data session, or during multiple predetermined segments, that include information such as change in rates or changes in balances from BRM 101. In contrast to known prior art, OCS 102 reacts to changes in a rating condition in the updates and notifies the network (i.e., UE 105 and associated network elements) to come back for re-authorization. Therefore, embodiments can consider any charging condition that changes during a long-running data session and use these conditions along with the reported usage from the network to provide a more accurate charge for a data session. Further, with the updated information at the end of each segment, embodiments can retain enough information for each segment of the session to be able to recreate the charge in the case of re-rating.

Figure 3:
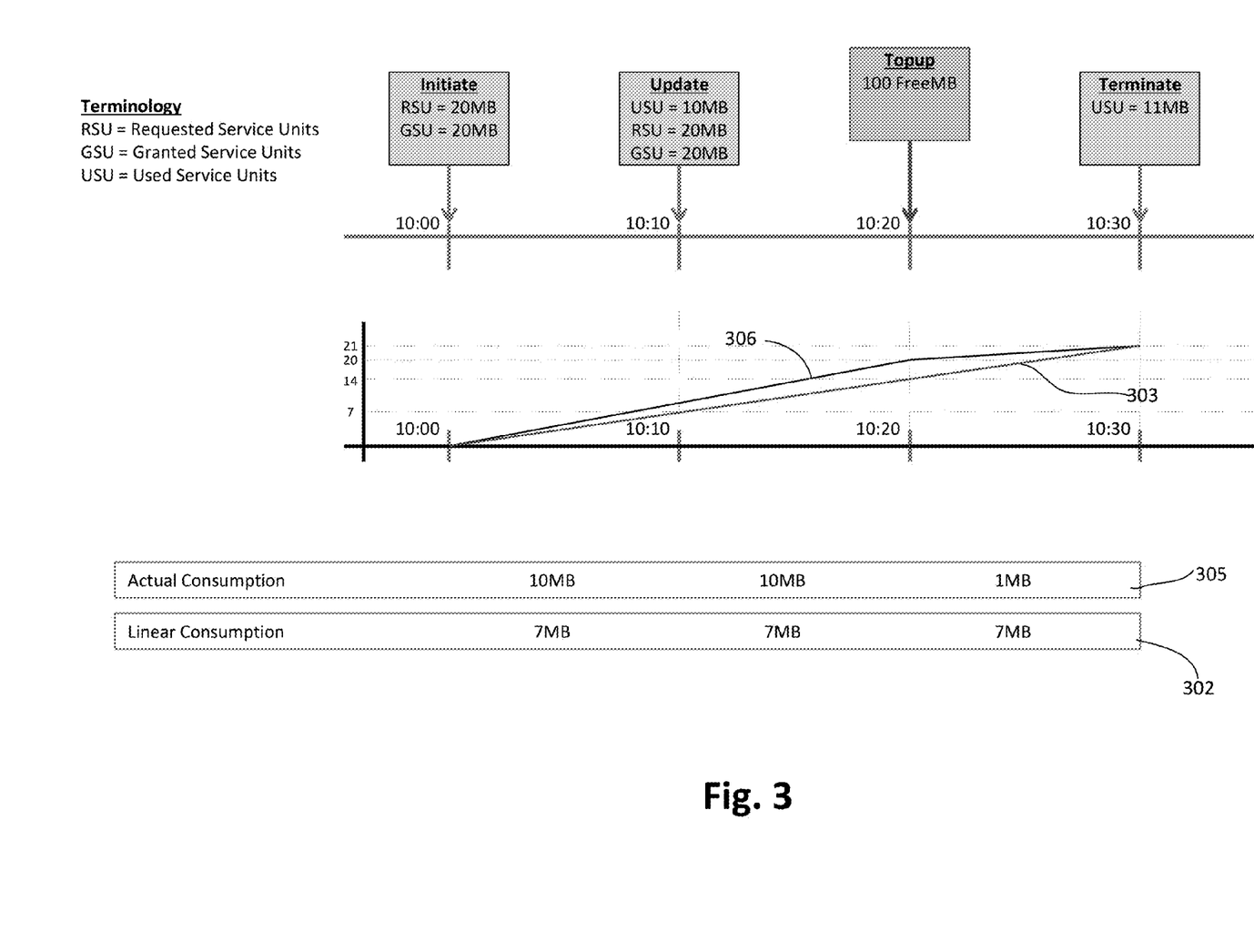
FIG. 3 is an example data session that illustrates non-linear data charging in accordance with one embodiment.

FIG. 3 is an example data session that illustrates non-linear data charging in accordance with one embodiment. The data session of FIG. 3 begins at 10:00 and ends at 10:30. In accordance with embodiments of the invention, the data session is broken up into three segments, which each span between segments lasting 10 minutes in the example of FIG. 3.

Initially at 10:00, to begin the session, UE 105, through other network elements, requests 20 MB of data (i.e., Requested Service Units ("RSU")) from OCS 102, and is granted 20 MB (i.e., Granted Service Units ("GSU")) by OCS 102. Between 10:00 and 10:10, the actual consumption of data is 10 MB (i.e., Used Service Units ("USU")). Between 10:10 and 10:20, the actual consumption of data is 10 MB. At 10:20, the user obtains a top-up of free 100 MB of additional data. A top-up can be any additional amount of available data units that are granted by BRM 101. In the example of FIG. 3, the top-up happens to occur during the data session. For example, a user may be able to go to a website and purchase more MBs of data, or obtain free additional MBs of data through any means, or an increase of MBs of data may be automatically scheduled to be applied at a certain time that happens to fall during the data session. The increase of MBs of data would be obtained from BRM 101.

Continuing with the example, between 10:20 and 10:30, 1 MB of data is consumed. As indicated, a total of 11 MB of data is consumed between 10:10 and 10:30. For the entire data session, a total of 21 MB of data is consumed.

As previously described, known charging systems in the example of FIG. 3 would calculate the data usage for the data session in a linear manner. Therefore, prior art charging systems, as indicated at 302 and by line 303, would assume that 7 MB of data was consumed linearly during each of the three segments, which would total the 21 MB. In contrast, embodiments of the invention would calculate data usage in accordance with actual consumption during each segment or update, as indicated by 305 and line 306.

Some advantages of embodiments of the invention can be shown in conjunction with FIG. 3. For example, assume peak (i.e., higher) data rates between 10:20 and 10:30, and off-peak (i.e., lower) data rates between 10:00 and 10:20. Under prior art systems, the subscriber would be charged 7 MB of peak use, and only 14 MB of off-peak use. In contrast, embodiments of the invention would calculate the actual usage of only 1 MB during the peak time of 10:20-10:30, and 20 MB of off-peak use, resulting in a lower charge to the subscriber.

Further, assume after usage of the granted 20 MB, the subscriber would be charged a much higher, per MB rate. Under prior art systems, there is no knowledge of the top-up at 10:20, and therefore the user would be charged a per MB rate for the 1 MB that exceeded the 20 MB grant. In contrast, embodiments of the invention are aware of the top-up based on communications received from BRM 101 during the session, and the additional 1 MB would be part of the free 100 MB top-up.

Figure 4:
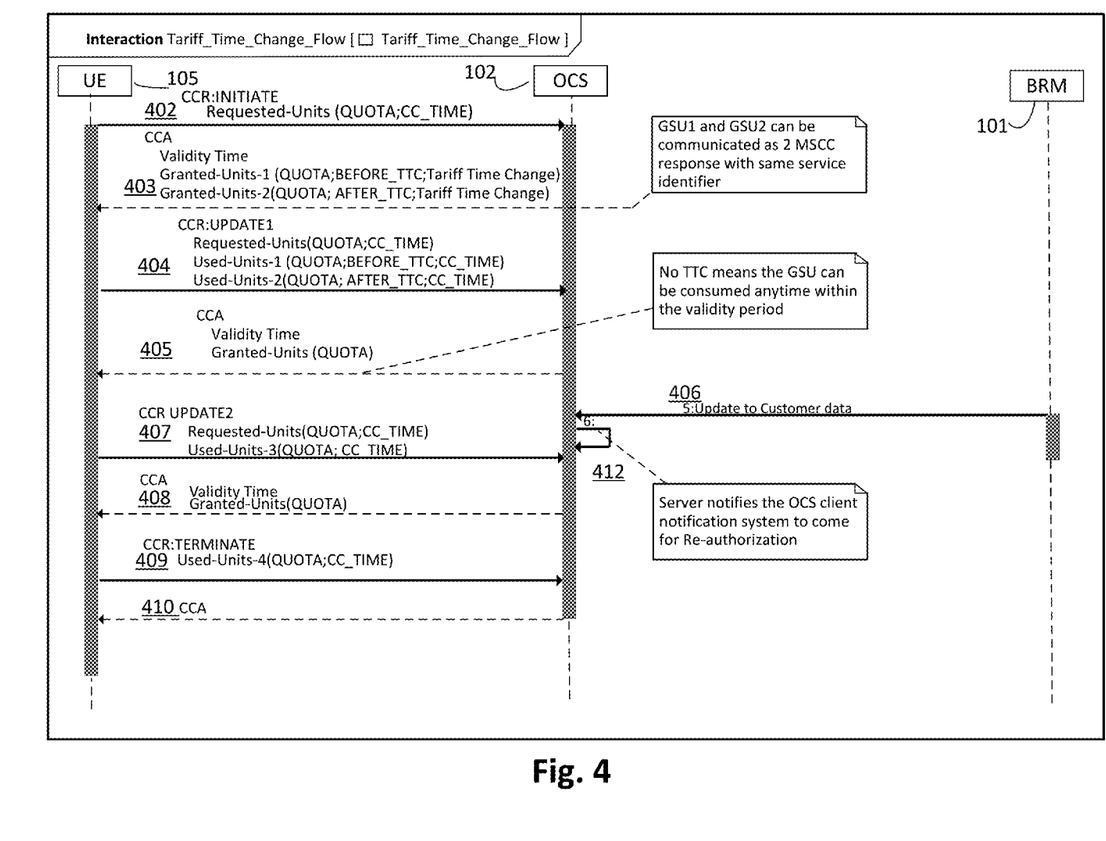
FIG. 4 is a call flow of a data session in accordance to embodiments of the present invention.

FIG. 4 is a call flow of a data session in accordance to embodiments of the present invention. The call flow of FIG. 4 is between network elements UE 105, and its associated network elements that allow UE 105 to initiate a data session, OCS 102, and BRM 101. The messaging shown in FIG. 4 is in accordance with the 3GPP related standards.

At 402, UE 105 generates a CCR:INITIATE message that includes an RSU for the data session.

At 403, OCS 102 generates a CCA message that includes a GSU1 and GSU2 for the data session. The embodiment of FIG. 4 includes two GSUs because OCS 102 is aware that there is a change in tariff upcoming. Rather than force the network to come back at the tariff time change, which could also result in a large amount of requests from all active sessions, OCS 102 grants a quota for before the change and one for after the change so that the network can report back later the used quantity for each time period (before and after the tariff change) separately.

At 404, UE 105 generates a CCR:UPDATE message that provides a first update to OCS 102 of the current data usage for the session and asks for a re-authorization. The timing of the update message at 404 can be predetermined/preconfigured (e.g., at every 10 minute interval, as defined in the CCA at 403) or it may be based on the knowledge of UE 105 that the granted data at 403 is almost exhausted (i.e., based on the consumption of the quota allocated). The CCR:UPDATE message at 404 includes two USUs: one for before the tariff time change, and one for after the tariff time change, which is known to UE 105 as a result of the CCA at 403. Therefore, OCS 102 can honor the non-linear/actual consumption that is reported in the two USUs.

At 405, in response to the Update message, OCS 102 generates a CCA message that may include additional GSU. OCS 102 determines whether to grant additional GSU based on current conditions such as current balances, offers, etc.

At 406, an update to the customer data (i.e., a changed charging condition) occurs in a message from BRM 101 to OCS 102. One example of an update is a top-up, such as shown in FIG. 3, that increases the subscriber's data balance by 100 MB. Other examples of updates include the purchase of a new offer, or an adjustment to the account balance or a refund. The updates at 406 can occur at random times, or can be triggered on a fixed based such as monthly grants (e.g., 500 free minutes) that would be triggered on a monthly basis.

At 412, in response to the changed charging condition, OCS 102 generates a re-authorization message that notifies the network, including UE 105 and associated network elements, to provide another Update message.

At 407, in response to the re-authorization message, UE 105 generates a CCR:UPDATE message that provides another Update message to OCS 102 of the current data usage for the session.

At 408, in response to the additional Update message, OCS 102 generates a CCA message that may include additional GSU. Because OCS 102 is aware of the update to the customer data in 406, the GSU at 408 may be modified accordingly based on the actual current conditions.

At 409, UE 105 generates a CCR:TERMINATE message to terminate the data session. The terminate message at 409 provides the last of the USUs for the data session.

At 410, OCS 102 generates a CCA message ending the data session.

In the call flow example of FIG. 4, two update messages 404, 407 from UE 105 to OCS 102 are generated. However, in other embodiments, any other number of update messages can be generated, depending on the length of the data session. Each update message provides OCS 102 with the current used units of data for the data session. In contrast to prior art networks, UE 105 generates update message 407 in response to the re-authorization message 412 from OCS 102, as opposed to at a pre-authorized time period such as at 404. Further, in contrast to prior art networks, embodiments keep track of the actual consumed units as part of 404, 407 and 409, as opposed to linearly distributing the units for the time between 402 and 409.

As discussed, changing charging conditions occur during long-running data sessions and usage of data services is not linearly consumed. The updates at 404 and 407 in the example of FIG. 4 provide a snapshot of usage consumption which, when combined with an understanding of the charging conditions present at that point in time, allow for storage of intermittent call records and the re-creation of a data session for re-rating without any loss of information.

As disclosed, embodiments provide usage updates to the OCS during a data session. Embodiments provide charging accuracy to the subscriber based on actual consumption. It also provides operators with the ability to recognize the revenue for long-running data sessions at configurable intervals in time.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of charging a data session of a subscriber, the method comprising:

in response to a request to initiate the data session, providing a first quantity of granted service units of data for the data session associated with a first charging condition;

during the data session, receiving a change in charging conditions for the subscriber;

in response to the change, sending a re-authorization message to the subscriber;

in response to the re-authorization message, receiving a first update message from the subscriber comprising a first used service units for the data session since the providing of the first quantity of granted service units of data;

in response to the first update message and based on the change in charging conditions and the first used service units, providing a second quantity of granted service units of data for the data session associated with a second charging condition; and charging the data session of the subscriber according to a total used service units comprising the first used service units included with the first update message under the first charging condition and second used service units for the data session used since the first update message under the second charging condition.

2. The method of claim 1, wherein the change in charging conditions comprises a top-up in a data balance of the subscriber.

3. The method of claim 1, wherein the change in charging conditions comprises the purchase of additional units of data.

4. The method of claim 1, further comprising receiving a time-based update message from the subscriber during the data session, the time-based update message being generated at a preconfigured time interval for the data session and comprising service units used since a last previous update message.

5. The method of claim 1, further comprising receiving a consumption-based update message from the subscriber during the data session, the consumption-based update message being generated in response to an amount of consumption of granted service units of data and comprising a service units used since a last previous update message.

6. The method of claim 1, further comprising, in response to the request to initiate the data session, providing a third granted service units of data for the data session;
wherein the first granted service units of data corresponds to before a tariff time change during the data session, and the third granted service units of data corresponds to after the tariff time change during the data session.

7. The method of claim 1, further comprising receiving a terminate request, the terminate request comprising a third used service units since a third previous update message.

8. A non-transitory computer-readable medium having instructions stored thereon that, when executed by a processor, cause the processor to charge a data session of a subscriber, the charging comprising:
in response to a request to initiate the data session, providing a first quantity of granted service units of data for the data session associated with a first charging condition;
during the data session, receiving a change in charging conditions for the subscriber;
in response to the change, sending a re-authorization message to the subscriber;
in response to the re-authorization message, receiving a first update message from the subscriber comprising a first used service units for the data session since the providing of the first quantity of granted service units of data;
in response to the first update message and based on the change in charging conditions and the first used service units, providing a second quantity of granted service units of data for the data session associated with a second charging condition; and
charging the data session of the subscriber according to a total used service units comprising the first used service units included with the first update message under the first charging condition and second used service units for the data session since the first update message under the second charging condition.

9. The non-transitory computer-readable medium of claim 8, wherein the change in charging conditions comprises a top-up in a data balance of the subscriber.

10. The non-transitory computer-readable medium of claim 8, wherein the change in charging conditions comprises the purchase of additional units of data.

11. The non-transitory computer-readable medium of claim 8, the charging further comprising receiving a time-based update message from the subscriber during the data session, the time-based update message being generated at a preconfigured time interval for the data session and comprising service units used since a last previous update message.

12. The non-transitory computer-readable medium of claim 8, the charging further comprising receiving a consumption-based update message from the subscriber during the data session, the consumption-based update message being generated in response to an amount of consumption of granted service units of data and comprising service units used since a last previous update message.

13. The non-transitory computer-readable medium of claim 8, the charging further comprising, in response to the request to initiate the data session, providing a third granted service units of data for the data session;
wherein the first granted service units of data corresponds to before a tariff time change during the data session, and the third granted service units of data corresponds to after the tariff time change during the data session.

14. The non-transitory computer-readable medium of claim 8, the charging further comprising receiving a terminate request, the terminate request comprising a third used service units since a third previous update message.

15. An Online Charging System (OCS) coupled to a user equipment (UE) and a Billing and Revenue Management System (BRM) through a communications network, the OCS comprising:
a processor that generates and receives network messages over the network, the generating and receiving comprising:
in response to a request to initiate the data session from the UE, providing to the UE a first quantity of granted service units of data for the data session associated with a first charging condition;
during the data session, receiving a change in charging conditions for the UE from the BRM;
in response to the change, sending a re-authorization message to the UE;
in response to the re-authorization message, receiving a first update message from the UE comprising a first used service units for the data session since the providing of the first quantity of granted service units of data;
in response to the first update message and based on the change in charging conditions and the first used service units, providing a second quantity of granted service units of data for the data session associated with a second charging condition to the UE; and
charging the data session of the subscriber according to a total used service units comprising the first used service units included with the first update message under the first charging condition and second used service units for the data session since the first update message under the second charging condition.

16. The OCS of claim 15, wherein the change in charging conditions comprises a top-up in a data balance of the UE.

17. The OCS of claim 15, wherein the change in charging conditions comprises the purchase of additional units of data.

18. The OCS of claim 15, further comprising receiving a time-based update message from the UE during the data session, the time-based update message being generated at a preconfigured time interval for the data session and comprising service units used since a last previous update message.

19. The OCS of claim 15, further comprising receiving a consumption-based update message from the UE during the data session, the consumption-based update message generated in response to an amount of consumption of granted service units of data and comprising service units used since a last previous update message.

20. The OCS of claim 15, further comprising, in response to the request to initiate the data session, providing to the UE a third granted service units of data for the data session;
    wherein the first granted service units of data corresponds to before a tariff time change during the data session, and the third granted service units of data corresponds to after the tariff time change during the data session.

* * * * *